United States Patent
Chiel et al.

[11] Patent Number: 5,816,037
[45] Date of Patent: *Oct. 6, 1998

[54] TREE-SHAKING AND HARVESTING APPARATUS

[76] Inventors: David Chiel, 21 Givat Hamoreh St., Afula Ilit; Eitan Zehavi, 12 Alonim Street, Kiriat Tivon 36000, both of Israel

[*] Notice: The term of this patent shall not extend beyond the expiration date of Pat. No. 5,469,695.

[21] Appl. No.: 719,158

[22] Filed: Sep. 24, 1996

[51] Int. Cl.⁶ ........................................ A01D 46/26
[52] U.S. Cl. .......................... 56/340.1; 56/328.1
[58] Field of Search .................. 56/340.1, 327.1, 56/328.1

[56] References Cited

U.S. PATENT DOCUMENTS

| | | |
|---|---|---|
| 1,626,068 | 4/1927 | Bartlett . |
| 2,692,470 | 10/1954 | Boman . |
| 3,021,168 | 2/1962 | Bodine . |
| 3,041,811 | 7/1962 | Sides . |
| 3,084,967 | 4/1963 | Harrett . |
| 3,121,304 | 2/1964 | Herbst . |
| 3,414,314 | 12/1968 | Martin . |
| 3,507,101 | 4/1970 | Bernshausen . |
| 3,545,182 | 12/1970 | Bernshausen . |
| 3,548,579 | 12/1970 | Shipley, Jr. . |
| 3,553,949 | 1/1971 | Rauth . |
| 3,596,455 | 8/1971 | Adrian . |
| 3,621,643 | 11/1971 | Gerrans . |
| 3,623,308 | 11/1971 | Nye . |
| 3,635,004 | 1/1972 | Webb et al. . |
| 3,771,301 | 11/1973 | Favor . |
| 3,771,768 | 11/1973 | Gebendinger . |
| 3,780,510 | 12/1973 | Tompkins . |
| 3,793,815 | 2/1974 | Hughes . |
| 3,896,612 | 7/1975 | McHugh et al. . |
| 3,964,244 | 6/1976 | Vallicella .................... 56/340.1 X |
| 4,128,986 | 12/1978 | Santarelli . |
| 4,194,347 | 3/1980 | Peters . |
| 4,269,021 | 5/1981 | Friday . |
| 5,123,238 | 6/1992 | Renehan . |
| 5,189,871 | 3/1993 | Frederiksen et al. . |
| 5,191,758 | 3/1993 | Cote . |
| 5,469,695 | 11/1995 | Zehavi et al. ....................... 56/340.1 |

FOREIGN PATENT DOCUMENTS

| 2522245 | 9/1983 | France ........................ 56/340.1 |

*Primary Examiner*—Terry Lee Melius
*Attorney, Agent, or Firm*—Cesari & McKenna LLP

[57] ABSTRACT

A tree-shaking apparatus includes a vibration mechanism of conventional design mounted on a movable, tilted frame support that serves to deflect falling harvest onto a conveyor and collection assembly, which is mounted on a separately movable frame support. The shaker assembly has a peaked configuration with grooves extending away from the peak and toward the shaker. A pair of upwardly inclined walls flank the peaked walls at their outer edges, preventing harvested material from rolling or bouncing off the sides of the frame. Uniting the two units are a series of cooperative, pivotable guides extending from each of the units. When extended during collection, the guides from the shaker assembly overlay the guides from the collection assembly, forming a substantially continuous downward path from the shaker assembly to the conveyor. At the completion of a collection cycle, when the units are to be moved to a different tree, the guides flip to a vertical or rearwardly inclined rest position that prevents them from shearing against the tree. The apparatus also includes a series of selectably engageable barrier projections along the front edge of the shaker assembly. When drawn into an upright position, the projections retain whatever harvest remains on the shaker assembly after shaking, and which would otherwise be lost as the shaker assembly moves to a new tree.

21 Claims, 3 Drawing Sheets

TREE-SHAKING AND HARVESTING APPARATUS

BACKGROUND OF THE INVENTION

1. Field of the Invention

The present invention relates to fruit- and nut-harvesting equipment, and more particularly to apparatus for shaking fruit and nuts from the limbs of trees.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation or vibration units. Because droppage occurs over the relatively wide area corresponding to the extent of the tree's foliage, suitable collection apparatus must span this area yet be conveniently transportable from tree to tree. Such apparatus should also include a local conveying assembly for drawing the harvest into a single container as it falls from the tree.

One common approach to collection is illustrated in U.S. Pat. Nos. 4,269,021, 3,623,308, 5,191,758, 5,123,238, and 1,626,068. In each of these patents a segmented, fan-shaped collection net, its panels canted to form a bowl, surrounds the tree so that falling fruit or nuts gather at the bottom of the net. From there it is transported to a bin by means of conveyors or the like. These arrangements are large and cumbersome, particulary when fully open, and can be difficult to maneuver into the precise position necessary for the net to properly encircle the tree. They must be fully opened before a tree is shaken and are ordinarily fully closed prior to transport to the next tree.

Another collection approach is set forth in U.S. Pat. No. 3,548,579, which discloses a two-part apparatus that encloses the tree from opposite sides as it is shaken. The fruit or nut harvest accumulates in opposing slack, flexible sheets that elevate and tilt when shaking is complete, causing the harvest to roll off onto a collection conveyor. This arrangement requires a relatively elaborate construction to provide the necessary snapping and tilting actions of the different components and to coordinate their interplay.

In U.S. Pat. No. 5,469,695 we disclosed a tree-shaking and harvesting configuration that addressed these limitations. The disclosed apparatus included a conventional vibration mechanism mounted on a movable, tilted frame support designed to deflect falling harvest onto a conveyor and collection assembly mounted on a separately movable frame support. In accordance with this approach, the shaking and collection units are brought separately to the tree, and unite with one another by means of rods that interlace during operation. The disclosed arrangement permits imprecise alignment between the two units, and does not require any special positioning of the collection unit, because the rods will interlace even if the units are slightly skewed with respect to one another around the tree.

DESCRIPTION OF THE INVENTION

Objects of the Invention

It is an object of the present invention to provide an improved tree-shaking apparatus based in part on the foregoing design, preserving the concept of a mechanically straightforward collection assembly that does not require special movements.

It is another object of the invention to provide a fruit- and nut-harvesting apparatus that can be easily maneuvered to a tree and more easily transported from tree to tree.

It is a further object of the invention to provide an alternative fruit- and nut-harvesting apparatus that can tolerate a range of orientations without loss of collection efficiency.

Other objects will, in part, be obvious and will, in part, appear hereinafter.

The invention accordingly comprises an article of manufacture possessing the features and properties exemplified in the constructions described herein and the apparatus embodying the features of construction, all as exemplified in the following summary and detailed description, and the scope of the invention will be indicated in the claims.

Brief Summary of the Invention

Building upon the design characteristics disclosed in the '695 patent, the present invention provides enhanced collection capability, reduced droppage and the improved ability to move from tree to tree.

In a first aspect, the invention comprises a shaker moutned within a tilted frame support that serves to deflect falling harvest onto a conveyor and collection assembly. The shaker assembly has a peaked configuration, and may contain grooves extending away from the peak and toward the shaker itself. These grooves serve to disperse the falling harvest along the front edge that includes the shaker, thereby discouraging concentration near the middle of the edge. optionally, a pair of upwardly inclined (and preferably hinged) walls flank the peaked walls at their outer edges, preventing harvested material from rolling or bouncing off the sides of the frame.

In a second aspect, the invention comprises a series of cooperative, pivotable guides extending from the shaker assembly and also from the collection assembly. When extended during collection, the guides from the shaker assembly overlay the guides from the collection assembly, forming a substantially continuous downward path from the shaker assembly to the conveyor. Because of the shape of these guides, they need not overlay one another in precise alignment. At the completion of a collection cycle, when the units are to be moved to a different tree, the guides tilt upward to avoid contact with debris on the ground; alternatively, the guides can tilt still higher, flipping to a vertical or rearwardly inclined rest position to prevent shearing against the tree.

In a third aspect, the invention comprises a series of selectably engageable barrier projections along the front edge of the shaker assembly. When drawn into an upright position, the projections retain whatever harvest remains on the shaker assembly after shaking, and which would otherwise be lost as the shaker assembly moves to a new tree. The projections are spaced sufficiently close to one another to prevent harvest from slipping between the projections when these are upwardly inclined. They can be raised manually or automatically (for example, when the shaker motor is shut off).

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
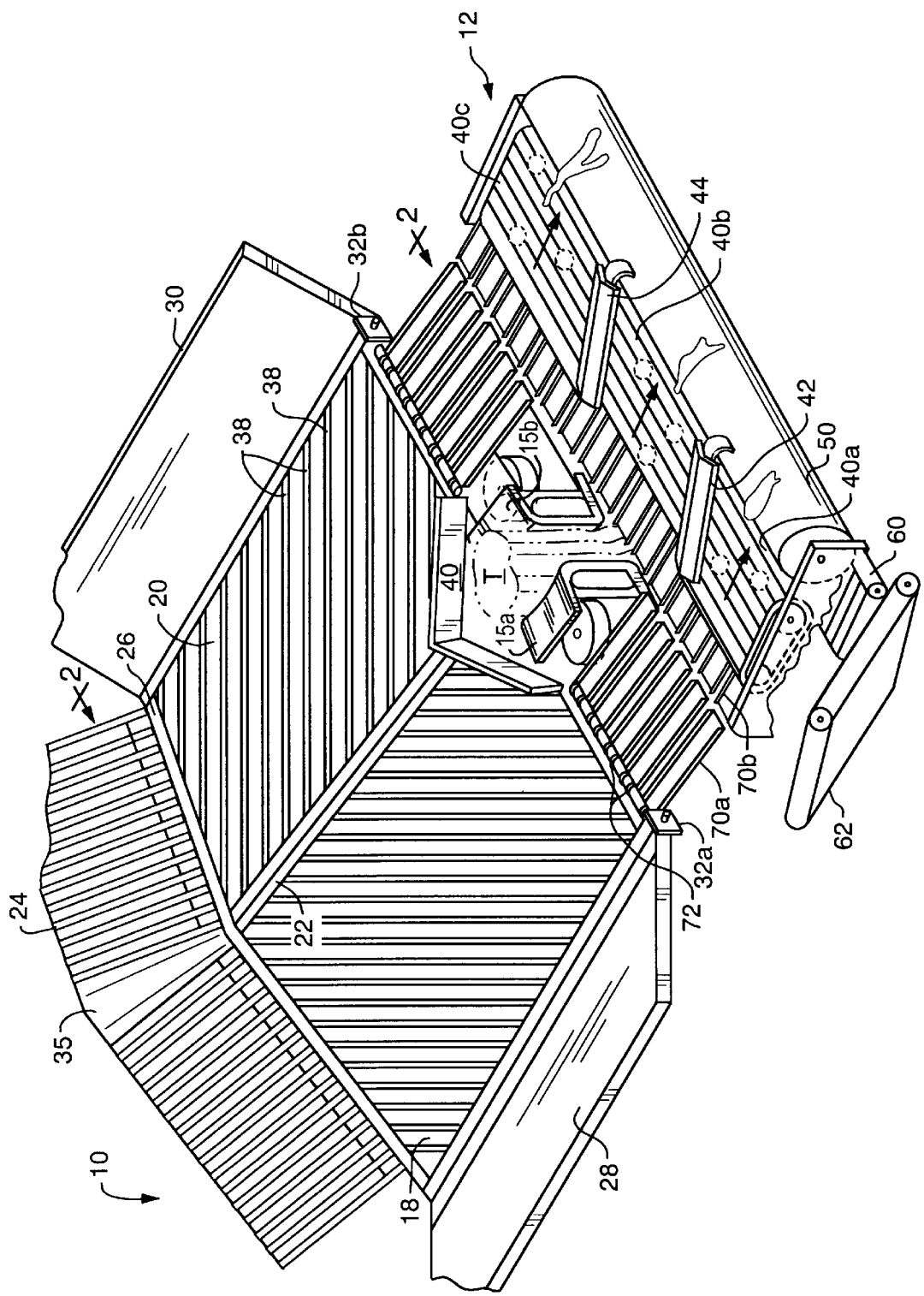
FIG. 1 is an isometric view of both the collection and shaking components of the present invention, shown in an operating configuration.

Refer first to FIG. 1, which shows the two primary components of the present invention, namely, a shaker assembly 10, which comprises a tree-shaking apparatus and deflection members; and a collection assembly 12. The tree-shaking apparatus rigidly mounted within shaker assembly 10 imparts vibration to a tree T by means of two oscillation units 15a and 15b, which engage opposite sides of the tree. Oscillation units 15a and 15b can be of standard design (see, e.g., U.S. Pat. Nos. 3,338,040, 3,548,578 and 4,903,471) or in accordance with the teachings of U.S. Pat. No. 5,473,875 (entitled TREE-SHAKING APPARATUS WITH DIRECTION AND FREQUENCY OPTIMIZATION CAPABILITY, commonly owned with the present invention and hereby incorporated by reference).

Figure 2:
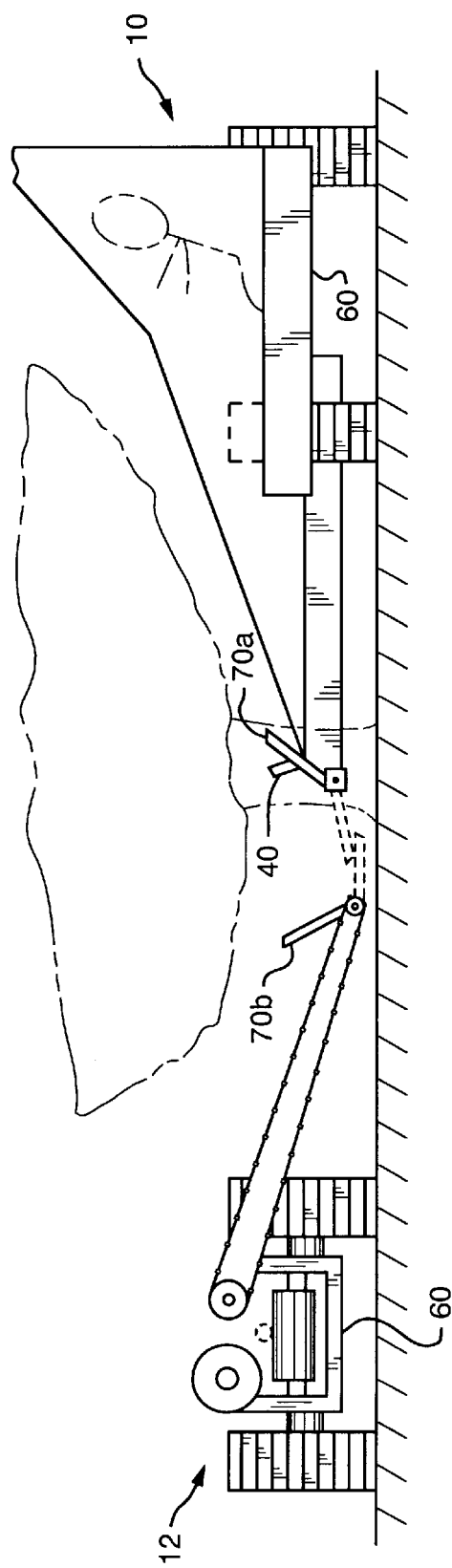
FIG. 2 is an elevational view, taken along the line 2—2 of FIG. 1, showing the collection and shaking assemblies properly positioned for operation but in a standby configuration, and illustrating the manner in which the assemblies are brought into the operating configuration.

Shaker assembly 10 includes a pair of tilted planar faces 18, 20 that slope generally downwardly, toward the ground, and are also peaked with respect to one another. A peaked divider 22 separates faces 18, 20, and a rear wall 24, contiguous with the rear edge 26 of faces 18, 20, inclines upwardly to prevent harvest from falling behind shaker assembly 10. An optional pair of side walls 28, 30, inclined upwardly from the side edges of faces 18, 20, prevent harvest from escaping to the sides. Preferably, side walls 28, 30 are joined to faces 18, 20 by suitable locking hinge members (two of which are representatively shown at 32a, 32b) about which the side walls pivot, either manually or hydraulically. In this way, side walls 28, 30 can be spread and locked into a wing-like operating configuration, as shown in FIG. 2, and later folded over onto faces 18, 20 for more convenient transportation and storage.

The faces and the side and rear walls are fabricated from a heavy-duty material, such as metal or fiberglass, or a mesh netting that is resilient enough to withstand the bombardment of harvest as it falls from the tree being shaken. Alternatively, the walls can be a series of metal bars 38 spaced closely enough to prevent penetration of harvest therebetween; or such bars can be used to reinforce overlying flat sheets. Shaker assembly 10 can be carried on treads or wheels and driven by an operator (see FIG. 2), in which case faces 18, 20 can be transparent (or, depending on the position of the driver, a window 35 provided in rear wall 24). In use, the operator can conveniently position the assembly 10 so that oscillation units 15a and 15b will flank tree T.

If desired, faces 18, 20 can also be provided with a series of grooves that extend away from peaked divider 22 and toward the front edges of faces 18, 20. During operation, these grooves disperse the falling harvest along the front edges.

The portion of shaker assembly 10 occupied by oscillation units 15a and 15b is bordered by a recessed retaining wall or dam 40, which is preferably fabricated from an elastic material (such as rubber) and is also peaked toward rear wall 24, so that harvest falling thereon rolls toward one or the other cluster of guides 70a.

Collection assembly 12 gathers dislodged fruit or nuts by means of a series of conveyors 40a, 40b, 40c. These are separated by two peaked dividers 42, 44. A longitudinal rotating brush 50 removes large debris such as leaves and branches transported by the conveyors, while the harvest falls into a gap between the conveyors and brush 50 and thereupon onto a take-off conveyor 60 for ultimate collection (for example, into a bin or other receiving container—such as the harvesting, collection and transfer apparatus described in allowed application Ser. No. 08/278,623—by means of a another conveyor 62).

An important feature of assemblies 10 and 12 is a series of flat guides 70a, 70b arranged along the front edge of each assembly and opposed to one another during operation. On shaker assembly 10, a series of guides 70a are disposed in two clusters on opposite sides of oscillation units 15a, 15b. Guides 70 are spaced sufficiently close to one another to prevent harvested fruit or nuts from slipping between them and falling to the ground. During operation, the guides 70a along shaker assembly 10 overlay the guides 70b along collection assembly 12. Guides 70 are preferably fabricated from a material that is strong enough to support the weight of the harvest as it travels between assemblies 10 and 12, but lightweight to facilitate convenient retraction and extension as described hereinbelow. Rubber, heavy-duty plastic (e.g., polyurethane) or fiberglass are suitable materials. Shaker assembly 10 also includes a series of pivoting retaining pins 72, as described more fully below.

Figure 3:
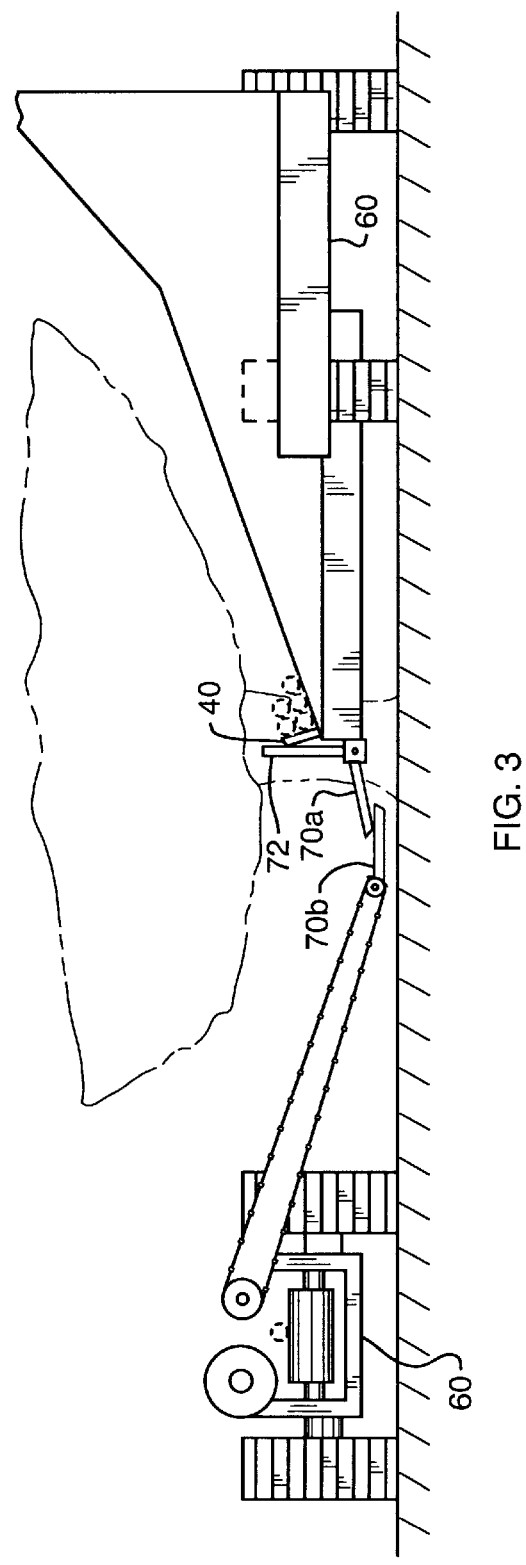
FIG. 3 shows the barrier projections engaged to prevent harvest from falling off the shaker assembly.

Refer now to FIGS. 2 and 3, which illustrate additional components and the mode of operation of the preferred embodiment of the present invention. As shown in these figures, both the shaker and collection assemblies are carried on mobile supports 60 and 62, respectively. These supports move independently by means of self-contained or attachable propulsion mechanisms, such as fuel engines, and can roll on wheels or, as illustrated, on metal or rubber treads; the choice of propulsion and drive mechanisms is largely one of design, and depends on such factors as the terrain and the number of trees likely to be shaken. In the figures, shaker assembly 10 is shown equipped with a self-contained propulsion and drive system that is controlled by an on-board operator; collection assembly 12 can be configured in a similar manner, or can instead contain suitable latches and unions (not shown) for coupling to an external hauling drive.

In operation, the shaker assembly 10 and collection assembly 12 are brought to suitable opposed locations adjacent to the tree T, as shown in FIG. 2. During transportation of the assemblies between trees, guides 70 are retained in a suitably inclined rest position, thereby preventing them from shearing against debris on the ground or against the tree. As shown in the figure, the inclined position can range from a slight tilt above horizontal (to avoid ground debris without contacting low-lying branches) to a reclining, rearwardly tilted position (to avoid striking the tree). The inclined guides 70 are then extended, as shown in phantom, so that guides 70a substantially overlay guides 70b. Guides 70a and 70b form, when overlaid, a substantially continuous downward path from faces 18, 20 to conveyors 40a, 40b, 40c. Indeed, as shown in FIG. 3, guides 70b can be tilted upwardly so that the collection path is fully downward.

During collection, shaker assembly 10 is positioned such that the oscillation units flank the trunk of the tree as shown in FIG. 1. If desired for operator convenience, the frames on which the oscillation units and faces (in the case of the shaker assembly) and the conveyors (in the case of the collection assembly) reside can be extendible and retractable laterally—i.e., toward and away from the tree—along rails in order to facilitate convenient positioning with respect to the tree. In this case, the reciprocation mechanism for extension and withdrawal is powered by the propulsion system of each assembly. Retaining pins 72 remain in an extended rest position as shown in FIG. 1, whereby fruit or nuts can roll freely over them along the collection path. Following collection, however, pins 72 pivot into a retention position that is sufficiently inclined to prevent any harvest remaining on shaker assembly 10 from falling onto the ground. Guides 70a, 70b are then drawn into the rest position, and the units 10, 12 are ready for transport to the next tree.

Figure 4:
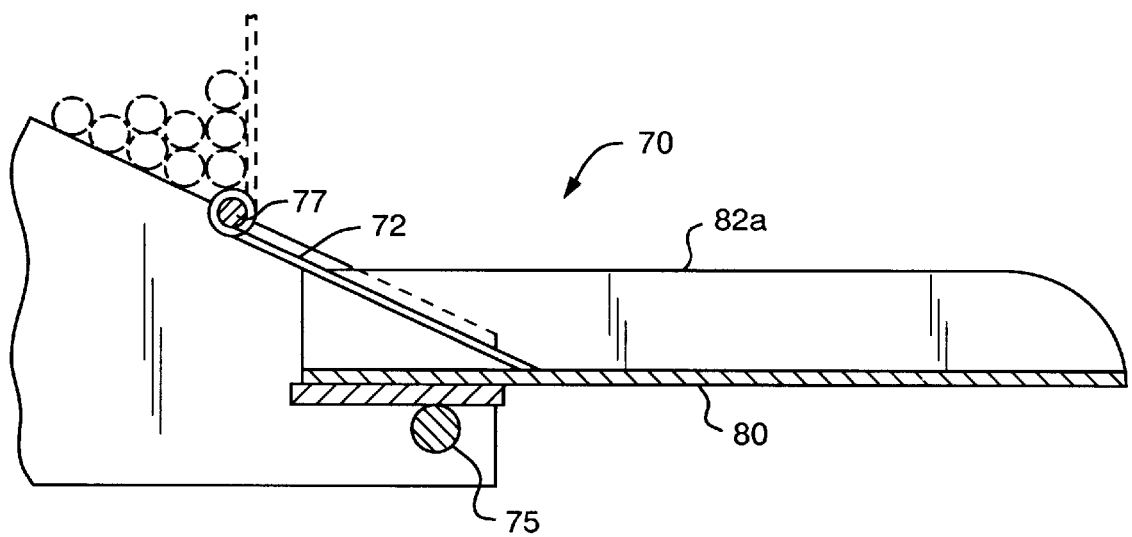
FIG. 4 shows a representative guide in the operating (extended) position and a barrier projection in the retention position.
Figure 5:
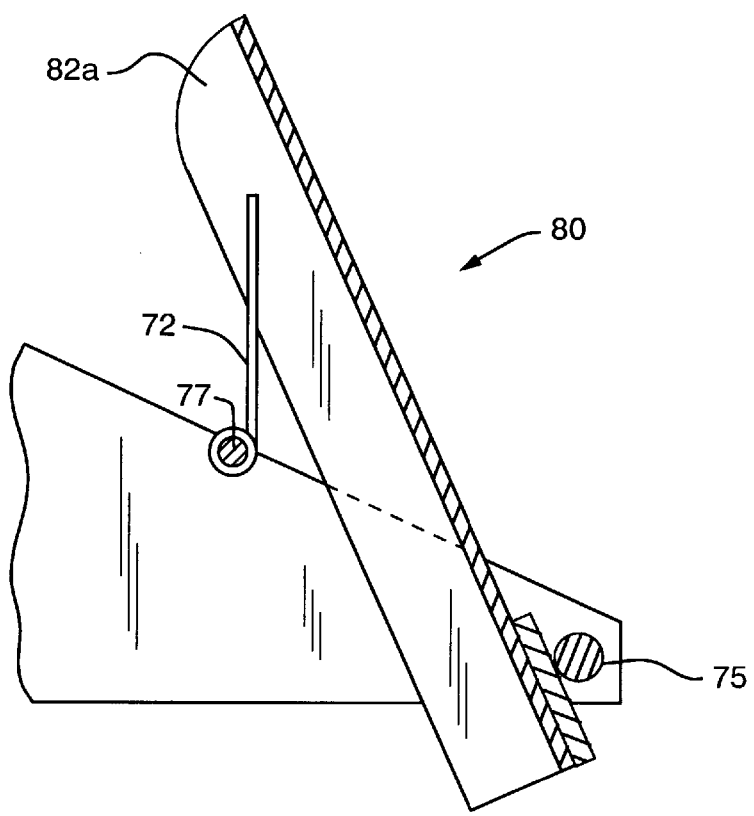
FIG. 5 shows the guide in the standby position.

Refer now to FIGS. 4 and 5, which illustrate the construction and operation of guides 70 and pins 72 in greater detail. The depicted guide 70 pivots on a hinge 75, and pin 72 on a hinge 77. Preferably, hinges 75 and 77 extend across and couple all guides 70 and pins 72 in a row, operating under hydraulic or other suitable form of power to rotate the row of guides or pins simultaneously. Rotative power can be applied manually by the operator, or automatically (e.g., as a result of shutting down oscillation units 15a and 15b). In FIG. 4, the depicted guide 70 is assumed to be associated with collection assembly 12 and is shown in a horizontal rest position. It is configured as a trough comprising a floor 80 and a pair of opposed walls on each side of floor 80, one wall being shown at 82a. Fruit or nuts roll freely along floor 80 and are channeled therealong by the side walls. Rotation of hinges 75 and 77 bring guide 70 into the rest position and pin 72 into the retaining position. Hinges 75 and 77 can incorporate a spring or other shock-absorbing mechanism to cushion the impact of the harvest striking the guides or the pins.

Numerous variations on the foregoing design are possible. For example, the flip-action mechanism of guides 70 and/or pins 72 can be eliminated by using hydraulically controlled extendible members instead.

It will therefore be seen that the foregoing represents a novel and advantageous two-part design for a fruit and nut harvester. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for harvesting fruit or nuts from a tree, the apparatus comprising:
  a. a first movable unit having a front edge and comprising, along the front edge, at least one series of flat guides spaced sufficiently close to one another to retain the harvest; and
  b. a second movable unit comprising:
    1) a tilted member having a front edge;
    2) means for shaking a tree; and
    3) along the front edge, at least one series of flat guides spaced sufficiently close to one another to retain the harvest,
    the first-unit guides being disposed such that, with the front edge of the first unit opposed to the front edge of the second unit, the first-unit guides overlay the second-unit guides.

2. The apparatus of claim 1 further comprising a conveyor on the first movable unit.

3. The apparatus of claim 2 wherein the first-unit guides flip from an inclined rest position into an extended position past the front edge.

4. The apparatus of claim 3 wherein the second-unit guides flip from an inclined rest position into an extended position past the front edge, the first-unit guides and the second-unit guides forming, when overlaid, a substantially continuous downward path from the tilted member to the conveyor.

5. The apparatus of claim 1 wherein the guides comprise troughs each having a floor and a pair of side walls.

6. The apparatus of claim 5 wherein the troughs have ends, the first-unit troughs and the second-unit troughs flip from a rest position into an extended position, and the ends of the second-unit troughs, when extended, overlie the ends of the first-unit troughs when the first-unit troughs are extended.

7. The apparatus of claim 1 wherein the tilted member comprises a peaked wall inclined downwardly toward the shaking means.

8. The apparatus of claim 7 wherein the peaked wall comprises grooves extending away from the peak and toward the front edge.

9. The apparatus of claim 1 wherein the second movable unit comprises two side edges and a pair of wing members extending from the side edges.

10. The apparatus of claim 9 wherein the wing members are hingedly affixed to the edges and pivot into an upwardly inclined collection position.

11. The apparatus of claim 1 further comprising, along the edge of the first movable unit, a series of pins pivotable from a rest position into an upwardly inclined retention position, the pins being spaced sufficiently closely to retain, in the retention position, harvest on the first movable unit.

12. The apparatus of claim 1 further comprising, along the front edge of the second movable unit, a series of pins pivotable from a rest position into an upwardly inclined retaining position, the pins being spaced sufficiently closely to retain harvest on the tilted member.

13. The apparatus of claim 1 further comprising means for moving the first unit from place to place.

14. The apparatus of claim 1 further comprising means for moving the second unit from place to place.

15. An apparatus for harvesting fruit or nuts from a tree, the apparatus comprising:
  a) a downwardly tilted member having a lowermost edge;
  b) means for shaking a tree; and
  c) means for retaining the harvest on the tilted member, the retaining means comprising, along the lowermost edge of the tilted member, at least one series of guides configured to incline to retain the harvest, the guides being spaced sufficiently close to one another to prevent harvest from slipping between the guides when inclined.

16. The apparatus of claim 15 wherein the tilted member comprises two side edges and the retaining means further comprises a pair of wing members inclined upwardly from the side edges.

17. The apparatus of claim 16 wherein the wing members are hingedly affixed to the tilted member.

18. The apparatus of claim 15 wherein the guides comprise troughs.

19. The apparatus of claim 18 wherein the guides further comprise pins.

20. The apparatus of claim 15 wherein the tilted member comprises a peaked wall inclined downwardly toward the shaking means.

21. The apparatus of claim 20 wherein the peaked wall comprises grooves extending away from the peak and toward the lowermost edge.

* * * * *